(12) United States Patent
Brunee

(10) Patent No.: US 8,813,948 B2
(45) Date of Patent: Aug. 26, 2014

(54) DEVICE FOR TRANSFERRING ARTICLES BETWEEN A MACHINE FOR MOVING THE ARTICLES INTERMITTENTLY AND A MACHINE FOR MOVING THE ARTICLES CONTINUOUSLY, AND A CORRESPONDING PACKAGING INSTALLATION

(71) Applicant: Serac group, La Ferte Bernard (FR)

(72) Inventor: Jacky Brunee, Campinas SP (BR)

(73) Assignee: Serac Group, La Ferte Bernard (FR)

( * ) Notice: Subject to any disclaimer, the term of this patent is extended or adjusted under 35 U.S.C. 154(b) by 0 days.

(21) Appl. No.: 13/661,926

(22) Filed: Oct. 26, 2012

(65) Prior Publication Data

US 2013/0139928 A1 Jun. 6, 2013

(30) Foreign Application Priority Data

Oct. 26, 2011 (FR) .................................... 11 59736

(51) Int. Cl.
*B65G 47/84* (2006.01)
*B65B 43/46* (2006.01)
*B65G 47/31* (2006.01)
*B65G 47/24* (2006.01)
*B65G 47/71* (2006.01)

(52) U.S. Cl.
CPC ................ *B65B 43/46* (2013.01); *B65G 47/71* (2013.01); *B65G 47/31* (2013.01); *B65G 47/841* (2013.01); *B65G 2201/0247* (2013.01); *B65G 47/24* (2013.01)
USPC ...................................... 198/441; 198/459.1

(58) Field of Classification Search
USPC ............. 198/441, 459.1, 459.2, 459.8, 469.1, 198/470.1
See application file for complete search history.

(56) References Cited

U.S. PATENT DOCUMENTS

| | | | |
|---|---|---|---|
| 3,330,400 A | | 7/1967 | Alexander |
| 5,308,233 A | * | 5/1994 | Denis et al. ................... 425/151 |
| 5,316,127 A | * | 5/1994 | Evrard ........................ 198/470.1 |
| 2003/0173186 A1 | | 9/2003 | Hiramoto et al. |
| 2004/0112714 A1 | | 6/2004 | Davaillon |
| 2012/0228087 A1 | * | 9/2012 | van der Vliet et al. ..... 198/470.1 |

FOREIGN PATENT DOCUMENTS

| | | |
|---|---|---|
| DE | 27 02 395 A1 | 8/1978 |
| DE | 195 42 647 A1 | 5/1997 |
| EP | 0 806 383 A1 | 11/1997 |
| EP | 1 790 593 A1 | 5/2007 |
| NL | 66 033 C | 7/1950 |
| WO | WO 2011/040810 A1 | 4/2011 |

* cited by examiner

*Primary Examiner* — William R Harp
(74) *Attorney, Agent, or Firm* — Muncy, Geissler, Old & Lowe, P.C.

(57) ABSTRACT

A device for transferring articles between a first machine implementing intermittent movement of the articles at a first predetermined pitch, and a second machine implementing continuous movement of the articles at a second predetermined pitch. The device includes a flexible conveyor extending around at least two pulleys so as to have at least one rectilinear segment facing a conveyor of the first machine and a rounded segment facing a conveyor of the second machine. The flexible conveyor of the device carries laterally-projecting article-handling members arranged at regular intervals in such a manner that the handling members are at a pitch corresponding to the first pitch in the rectilinear segment. The rounded segment has a radius such that the handling members are at a pitch corresponding to the second pitch in the rounded segment.

12 Claims, 7 Drawing Sheets

DEVICE FOR TRANSFERRING ARTICLES BETWEEN A MACHINE FOR MOVING THE ARTICLES INTERMITTENTLY AND A MACHINE FOR MOVING THE ARTICLES CONTINUOUSLY, AND A CORRESPONDING PACKAGING INSTALLATION

FIELD OF THE INVENTION

The present invention relates to transferring articles, in particular containers, between machines that move the articles with different kinds of movement and at different pitches.

The invention is applicable more particularly to installations for packaging fluids in containers, the installation comprising a container-blower machine and a machine for filling and closing the containers.

BACKGROUND OF THE INVENTION

The blower machine performs intermittent movement and generally comprises an inlet conveyor bringing in injection-molded preforms, an oven for heating the preforms, blow nozzles mounted facing molds in order to inject air into the heated preforms received in the molds, and an outlet conveyor for removing the containers. In certain machines, for reasons associated with the blow-molding method implemented, the molds are fed simultaneously with preforms in such a manner that a plurality of containers can be blown simultaneously before being removed. In such machines, the outlet conveyor may be formed for example by a comb that performs intermittent rectilinear movement of the walking beam type for the purpose of removing the containers in batches corresponding to the number of containers that are blown simultaneously.

The filling and closing machine that performs continuous movement generally comprises a container transport device that is provided with clamps for gripping the containers and that passes under filler nozzles and then under closure spindles for closing said containers.

In such installations, it often happens that the containers are advanced in the two machines at pitches that are not identical, the filling and closing machine requiring a pitch that is longer. It is therefore common practice for a temporary storage conveyor to be interposed between the two machines. The intermediate storage conveyor is bulky and expensive.

OBJECT AND SUMMARY OF THE INVENTION

An object of the invention is to provide means for improving the transfer of articles between two machines operating with different kinds of movement and with different advance pitches.

To this end, the invention provides a device for transferring articles between a first machine implementing intermittent movement of the articles at a first predetermined pitch, and a second machine implementing continuous movement of the articles at a second predetermined pitch. The device comprises a flexible conveyor extending around at least two pulleys so as to have at least one rectilinear segment facing a conveyor of the first machine and a rounded segment facing a conveyor of the second machine, the flexible conveyor of the device carrying laterally-projecting article-handling members arranged at regular intervals in such a manner that the handling members are at a pitch corresponding to the first pitch in said rectilinear segment, and said rounded segment has a radius such that the handling members are at a pitch corresponding to the second pitch in the rounded segment.

Thus, the curvature of the flexible conveyor in the rounded segment causes the free ends of the handling members to be splayed apart from one another, thereby obtaining an increase in pitch compared with the pitch of the handling members in the rectilinear segment. Moving the articles from one segment to the other thereby causes them to be put at the appropriate pitch.

Advantageously, the device of the invention comprises at least one guide rail from which the articles are suspended, the guide rail extending along the rectilinear segment and along at least a portion of the rounded segment, and the handling members are arranged to be movable between an active position for making contact with the articles and a retracted inactive position in which the articles escape from contact with the handling members.

The invention also provides a packaging installation comprising a container-blower machine with an outlet conveyor that implements intermittent rectilinear movement at a first predetermined pitch, a container-filler machine with an inlet conveyor that implements continuous rotary movement, and a transfer device of the above type and installed between the blower machine and the filler machine in such a manner that the rectilinear segment extends facing the outlet conveyor of the blower machine and the rounded segment is tangential to the inlet conveyor of the filler machine, the device including a driven pulley controlled by the filler machine.

BRIEF DESCRIPTION OF THE DRAWINGS

Other characteristics and advantages of the invention appear on reading the following description of particular, non-limiting embodiments of the invention.

Reference is made to the accompanying drawings, in which.

MORE DETAILED DESCRIPTION

The installation in accordance with the invention that is described herein is an installation for packaging containers, each comprising a body surmounted by a projecting neck from which there extends a collar.

With reference to the figures, the installation in accordance with the invention comprises a container blower machine 100, a container filler machine 200, and a transfer device 300.

Figure 1:
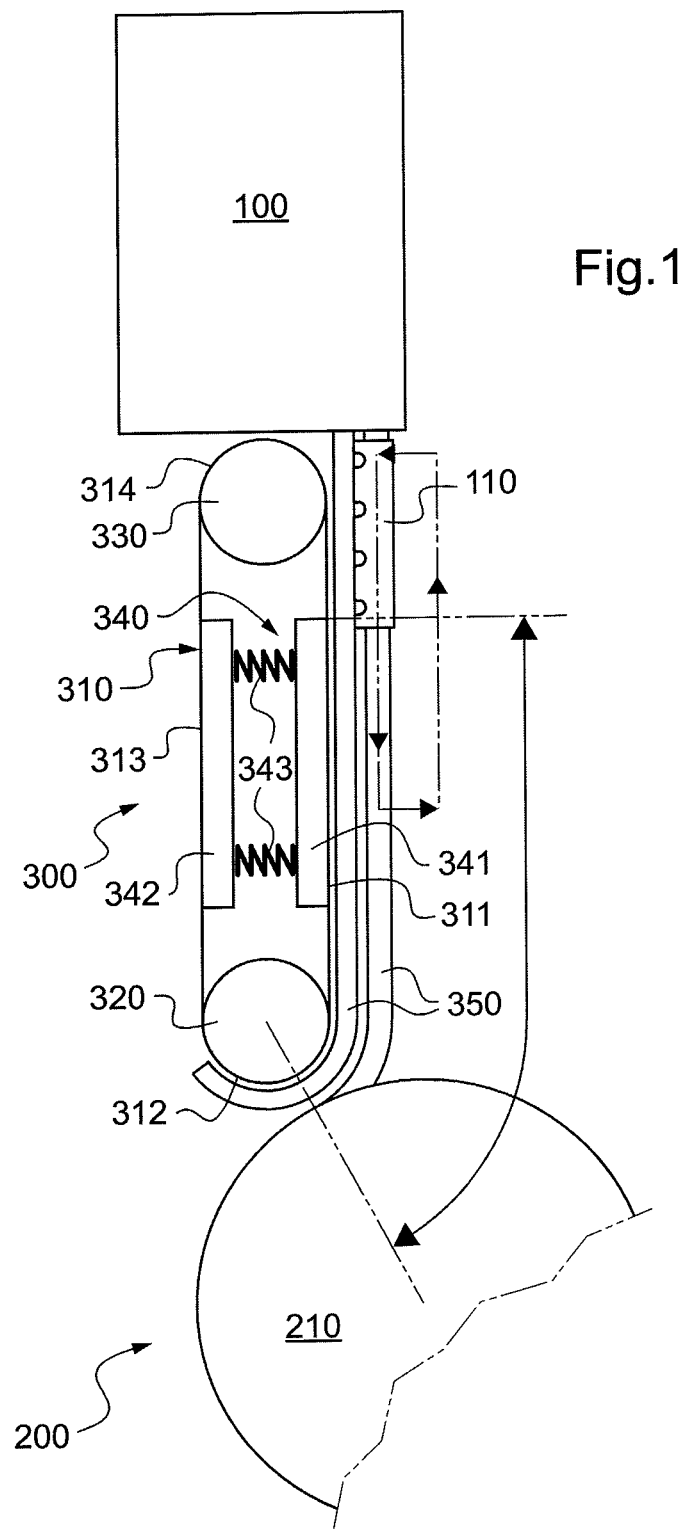
FIG. 1 is a diagrammatic plan view of an installation in accordance with the invention.
Figure 2:
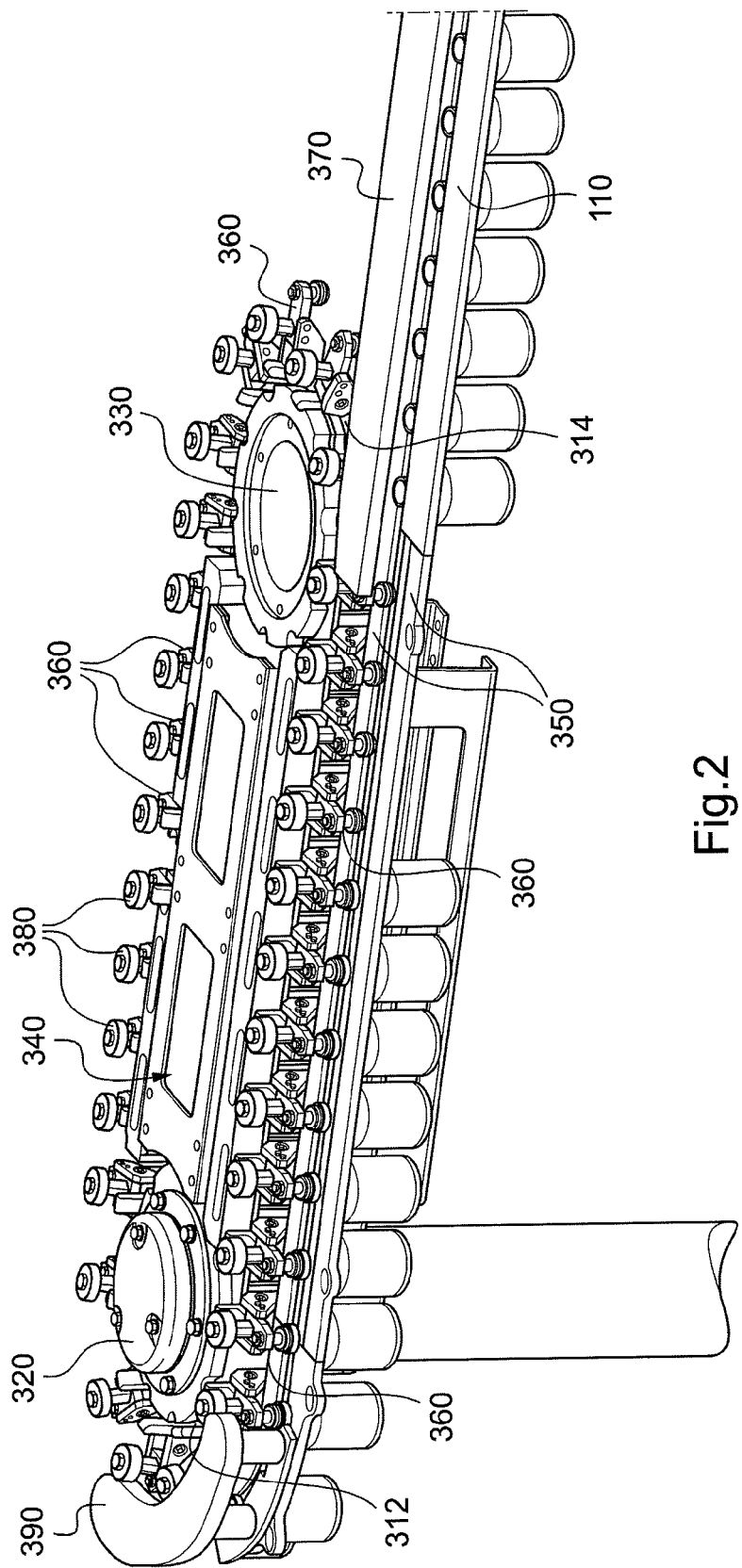
FIG. 2 is a perspective view of an installation in a first embodiment of the invention, before loading a batch of containers on the flexible conveyor.

The machine 100 has an inlet conveyor for feeding injection-molded preforms into molds, an oven for heating the preforms, blow nozzles mounted facing the molds in order to inject air into the preforms received in the molds, and an outlet conveyor for removing the containers. The molds in this example are arranged in a line and they are fed simultaneously with containers in such a manner that a plurality of containers can be blown simultaneously prior to being removed. The machine 100 has an outlet conveyor 110 formed in this example by a comb driven with intermittent rectilinear movement of the walking beam type along a rectangular path represented by a chain-dotted line in FIG. 1. The comb is provided with as many receptacle-reception slots as the machine 100 has molds. The outlet conveyor 110 can thus remove the containers in batches corresponding to the number of containers that are blown simultaneously. The machine 100 is itself known, such that only the portion that interacts directly with the transfer device of the invention is shown herein, i.e. the outlet conveyor 110. The outlet conveyor 110 that performs intermittent rectilinear movement operates at a first predetermined pitch.

The machine 200 has an inlet conveyor 210, a rotary platform in this example, that is provided with clamps for gripping containers placed vertically facing the container-filler nozzles. The machine 200 is itself known, such that only the portion that interacts directly with the transfer device of the invention is shown, i.e. the inlet conveyor 210. The inlet conveyor 210 operates with continuous rotary movement at a second predetermined pitch.

The transfer device 300 comprises a flexible conveyor 310 extending around two pulleys 320 and 330 so as to have two rectilinear segments 311 and 313 between the pulleys 320 and 330, and two rounded segments 312 and 314 respectively around the pulley 320 and around the pulley 330. The transfer device 300 is arranged in such a manner that the rectilinear segment 311 extends tangentially to a terminal portion of the conveyor 110 of the first machine 100 and the rounded segment 312 extends tangentially to a portion of the conveyor 310 of the second machine 300. The pulley 320 is a driven pulley controlled by the machine 200 such that the rectilinear segment 311 of the flexible conveyor 310 is tensioned.

The transfer device 300 includes means given overall reference 340 for guiding and tensioning the flexible conveyor 310. The guide and tensioning means comprise a stationary skid 341 providing the rectilinear segment 311 with backing support, and a movable skid 342 providing the rectilinear segment 313 with backing support. Between the two skids 341 and 342 there are mounted resilient spacer means constituted in this example by springs 343 serving to keep the flexible conveyor 310 under tension.

Two guide rails 350 extend parallel to each other from the machine 100 to the machine 200 along the rectilinear segment 311 and along a portion of the rounded segment 312. The guide rails 350 are spaced apart by a gap of width lying between the neck diameter of the containers and their collar diameter, such that the containers can be suspended from the guide rails 350 by their collars.

Projecting laterally, the flexible conveyor 310 carries container-handling members 360. The handling members 360 are fastened at regular intervals in such a manner that the handling members 360 are at a pitch that corresponds to the first pitch in the rectilinear segment 311. The pulley 320, and thus the rounded segment 312, have a radius such that the handling members 360 have a pitch corresponding to the second pitch in the rounded segment 312.

The flexible conveyor 310 in this example is a chain having links, each of which has one of the handling members 360 mounted thereon.

Each handling member 360 is mounted on the flexible conveyor 310 to be movable between an active position in which the handling member 360 extends in the vicinity of the guide rails 350 to push the containers along the guide rails 350, and a retracted inactive position in which the containers supported by the guide rails 350 escape from contact with the handling members 360.

The transfer device has control means for controlling the handling members 360 and arranged to bring the handling members 360 into the active position in a transfer zone T that extends over a portion of the rectilinear segment 311 and an adjacent portion of the rounded segment 312, and into an inactive position when not in this zone.

With reference more particularly to FIGS. 2 to 5, and in a first embodiment of the invention, each handling member 360 is mounted on the corresponding link of the flexible conveyor 310 to pivot about a horizontal axis parallel to a local travel direction of the flexible conveyor 310 in such a manner that in the active position the handling member 360 has a finger that is lowered to be engaged in the neck of a container, and in the inactive position, the finger of the handling device 360 is raised so as to be disengaged from the neck of a container.

In this example, the control means comprise a cam 370 secured to the conveyor 110 of the first machine 100 and arranged to hold the handling members 360 in their inactive position while the conveyor 110 is engaged with the containers and to allow the handling members 360 to return to their active position under the effect of resilient return means when the conveyor 110 is disengaged from the containers. The resilient return means connect each handling member 360 to the link on which it is mounted.

The operation of the installation is described below. It should be observed that containers have already been loaded on the flexible conveyor 310.

Figure 3:
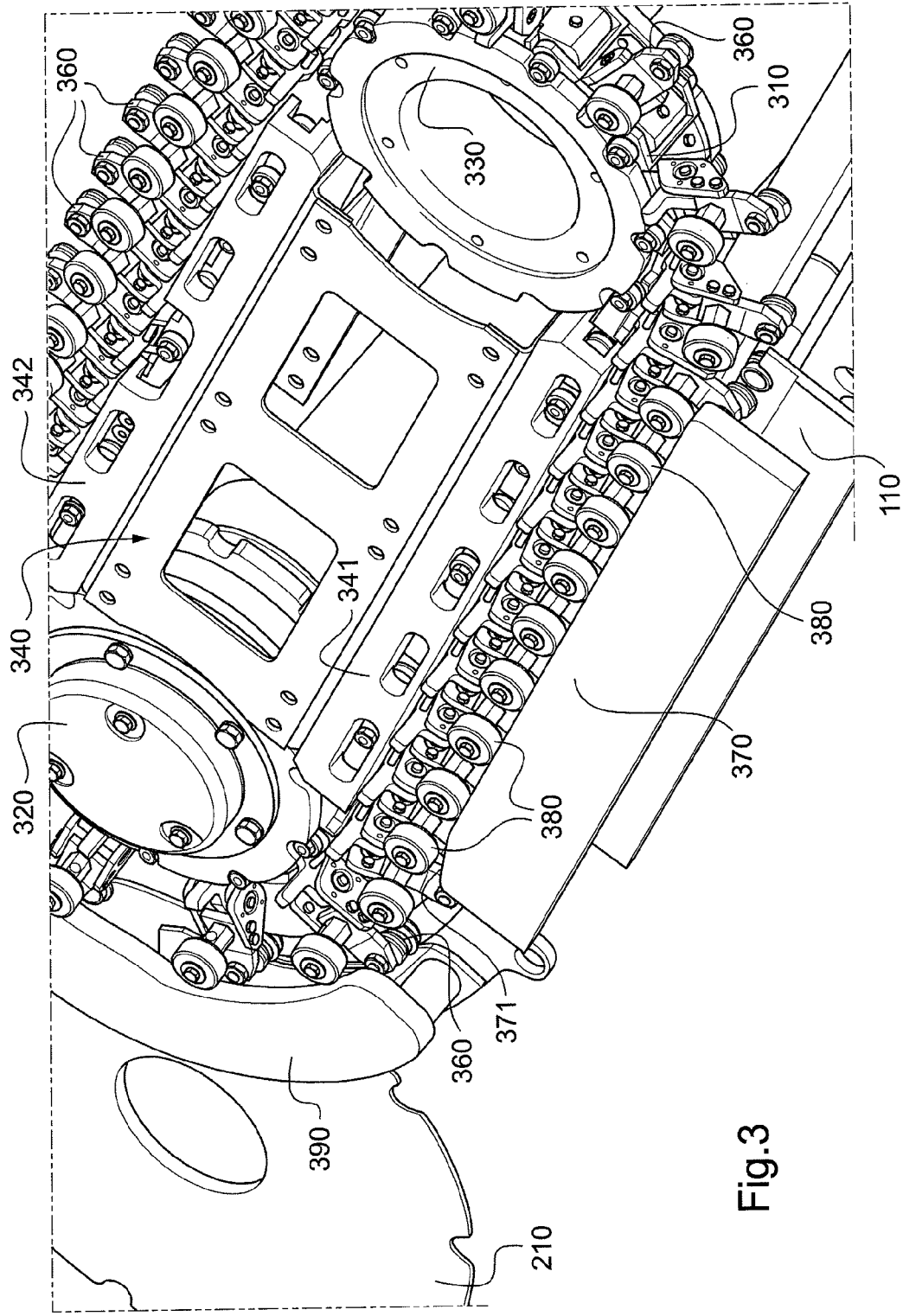
FIG. 3 is a perspective view of the same installation while loading the containers.
Figure 4:
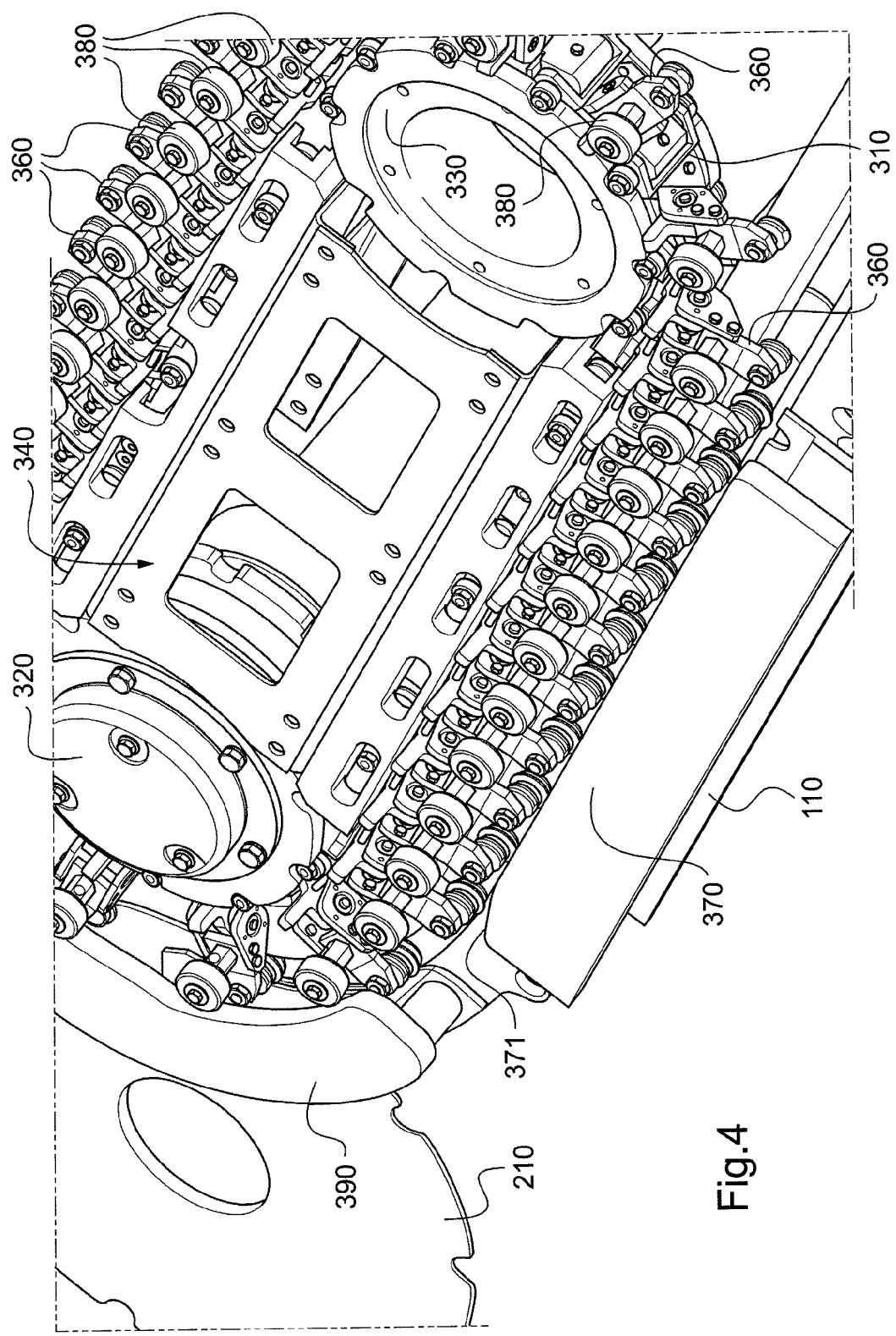
FIG. 4 is a view analogous to FIG. 3 showing the installation after the containers have been loaded onto the flexible conveyor.
Figure 5:
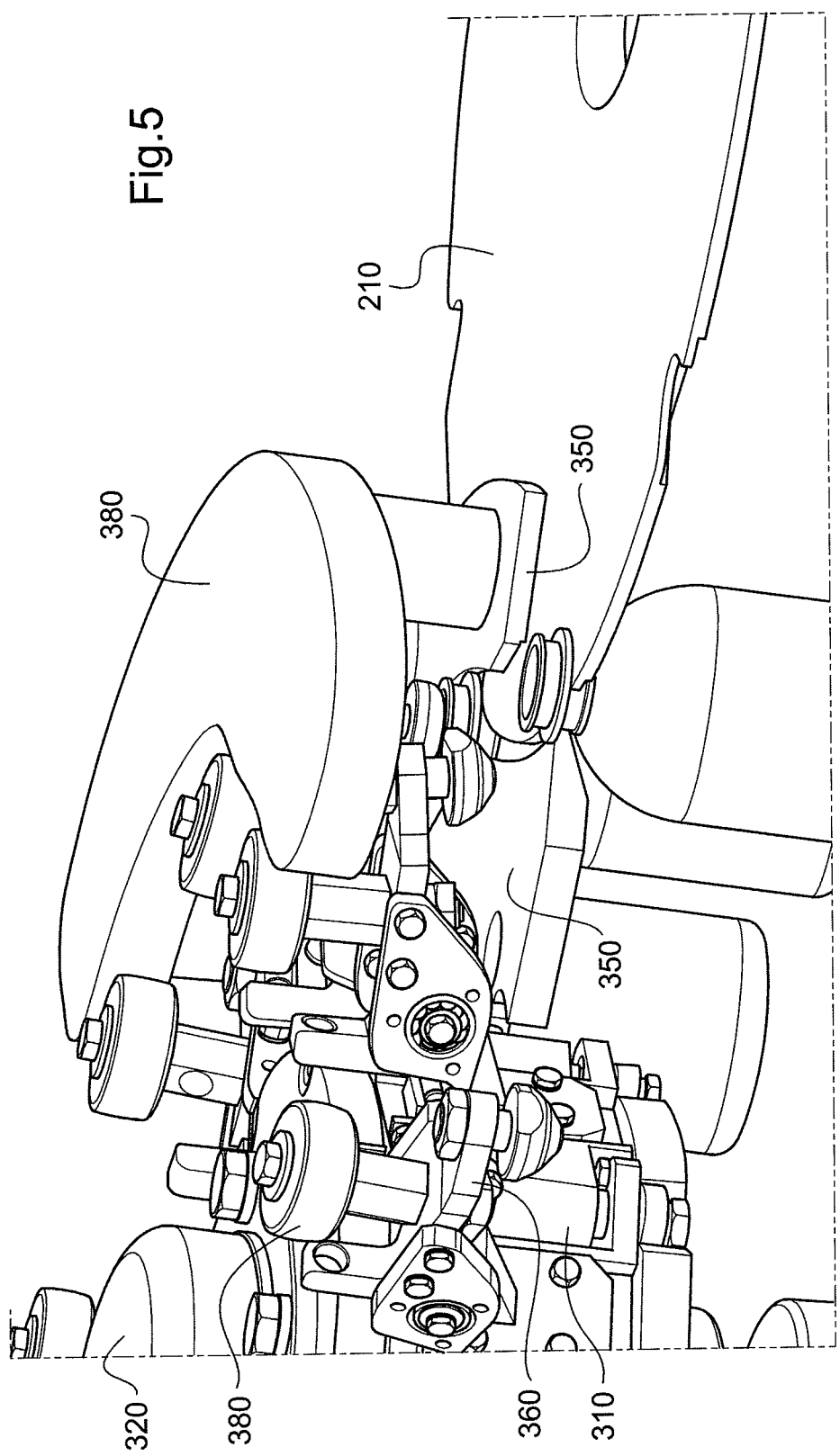
FIG. 5 is a detail view in perspective of the unloading zone of the transfer device.

It can be understood that, at the outlet from the machine 100, the containers that have just been blown rest on the rails 350 and that they are removed by the outlet conveyor 110, which is brought into engagement with said containers in a first position (FIG. 2) prior to being moved along the rails 350 until it extends facing the rectilinear segment 311 in a second position (FIG. 3). In so doing, the front ramp 371 of the cam 370, which extends in front of the slots of the comb forming the conveyor 110, meets wheels 380 secured to the handling members 360 and brings the handling members 360 into the inactive position. The flexible conveyor 310 and the conveyor 110 are caused to advance in such a manner that in the second position the conveyor 110 brings the containers into the immediate vicinity of containers already loaded on the flexible conveyor 310 so that between two successive batches of containers loaded onto the flexible conveyor, there is no free handling member 360.

The conveyor 110 is then backed away (FIG. 4) so as to be disengaged from the containers. On moving backwards in this way, the cam 370 releases the wheels 380, and the handling members return to the active position under drive from the resilient return means.

The conveyor 110 is then returned to its first position so as to be brought back into engagement with newly-blown containers.

Simultaneously, the flexible conveyor 310 continues to move and brings containers loaded thereon progressively to face the gripper members of the conveyor 210. A cam 390 curving facing a portion of the rounded segment 312 cooperates with the wheels 380 to bring the handling members 360 progressively into their inactive position so as to transfer the containers from the flexible conveyor 310 to the conveyor 210.

Figure 6:
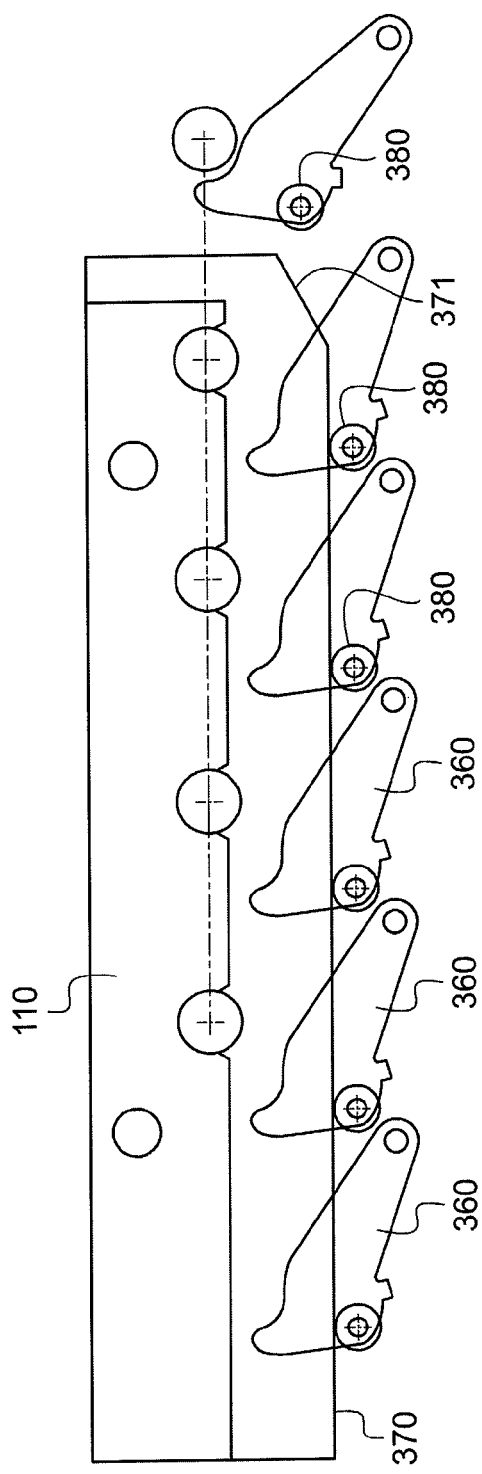
FIG. 6 is a fragmentary diagrammatic plan view of an installation in a second embodiment, immediately before loading a batch of containers on the flexible conveyor.
Figure 7:
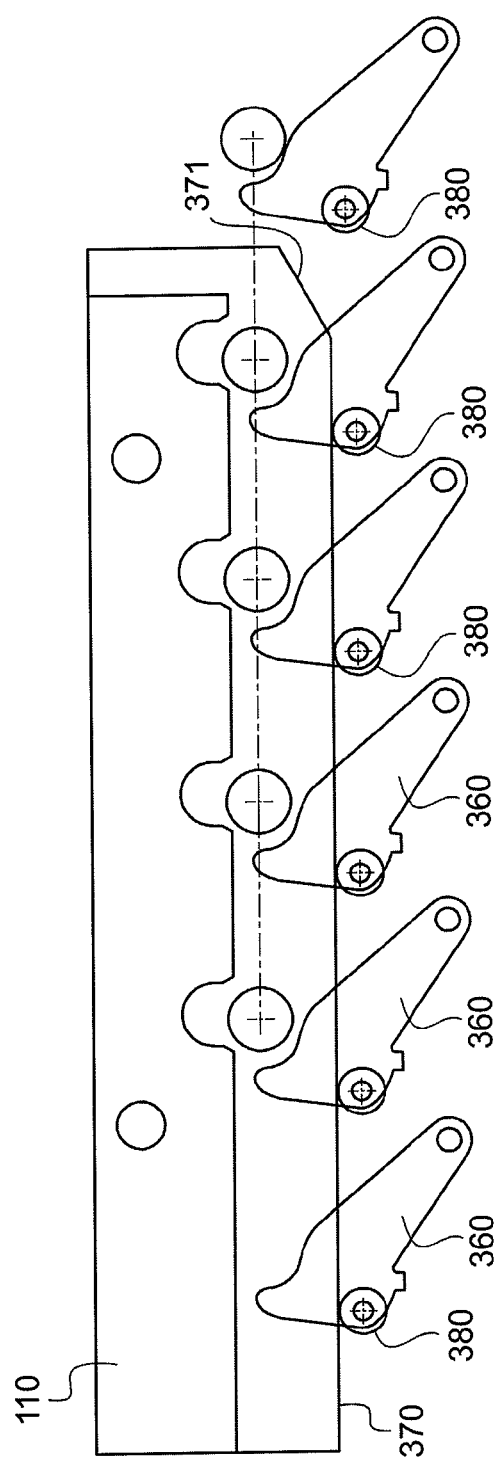
FIG. 7 is a view analogous to FIG. 6 showing this installation immediately after the containers have been loaded onto the flexible conveyor.

With reference to FIGS. 6 and 7, in a transfer device in accordance with the second embodiment of the invention, the handling members 360 are mounted on the flexible conveyor so as to move laterally relative to the flexible conveyor.

More precisely, the handling members 360 are mounted on the links of the flexible conveyor 310 to pivot about respective hinge axes perpendicular to the rails 350. Each handling member 360 is in the form of a lever having one end connected to the hinge axis and an opposite end arranged to bear against the side of a neck, in this example above the collar. The lever is also provided with a wheel 380 for bearing against the cam 370 secured to the conveyor 110.

Operation is identical to that of the first embodiment except that the handling members 360 pivot between their active position (FIG. 7) and their inactive position (FIG. 6) along a circularly arcuate path that is horizontal and not vertical.

Figure 8:
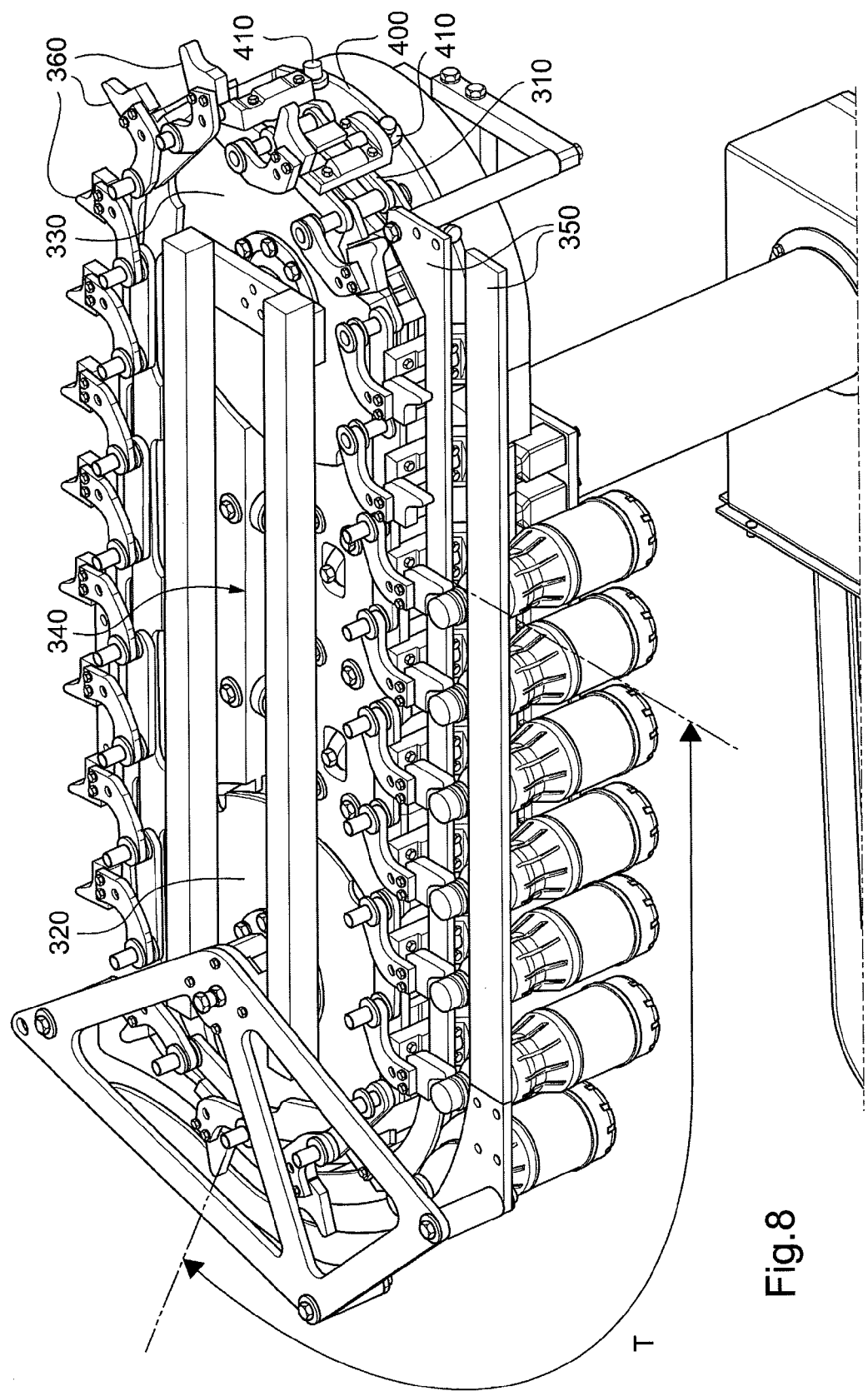
FIG. 8 is a perspective view of an installation in a third embodiment of the invention.

With reference to FIG. 8, and in a third embodiment of the invention, each handling member 360 is mounted to slide vertically relative to the flexible conveyor 310 between its active position and its inactive position.

In this example, the control means comprise a cam path 400 extending facing the flexible conveyor, and the handling members 360 are associated with respective wheels 314 running on the cam path 400.

Naturally, the invention is not limited to the embodiments described but covers any variant coming within the ambit of the invention as defined by the claims.

In particular, the transfer device of the invention may be used in any type of installation for processing articles between two machines that operate with different advance pitches.

The handling members may be of a structure that is different and they may, for example, be constituted by clamps.

The flexible conveyor may be constituted by a deformable band.

The conveyor of the first machine is an inlet conveyor and the conveyor of the second machine is an outlet conveyor, or vice versa.

Advantageously, the driving pulley supports the rounded segment of the flexible conveyor of the transfer device.

The control means may be of a structure that is different from that described. The control means for the handling members may be arranged so as to bring the handling members into the active position in an article transfer zone that extends over at least a portion of the rectilinear segment 311 and at least an adjacent portion of the rounded segment 312, and bring them into an inactive position outside said zone, at least at both ends of the zone, or in a variant in one or more zones other than those mentioned above.

What is claimed is:

1. A device for transferring articles between a first machine implementing intermittent movement of the articles at a first predetermined pitch, and a second machine implementing continuous movement of the articles at a second predetermined pitch, the device comprising a flexible conveyor extending around at least two pulleys so as to have at least one rectilinear segment facing a conveyor of the first machine and a rounded segment facing a conveyor of the second machine, the flexible conveyor of the device carrying laterally-projecting article-handling members arranged at regular intervals in such a manner that the handling members are at a pitch corresponding to the first pitch in said rectilinear segment, and said rounded segment has a radius such that the handling members are at a pitch corresponding to the second pitch in the rounded segment, the device including at least one guide rail from which the articles are suspended, the guide rail extending along the rectilinear segment and along at least a portion of the rounded segment and wherein the handling members are arranged to be movable between an active position in the vicinity of the guide rail for making contact with the articles, and a retracted inactive position in which the articles escape from contact with the handling members, the device having control means for controlling the handling members and arranged to bring the handling members into the active position in an article-transfer zone that extends over at least a portion of the rectilinear segment and at least an adjacent portion of the rounded segment, and an inactive position outside said zone, at least at the two ends of the zone.

2. A device according to claim 1, wherein the conveyor of the first machine is an inlet conveyor and the conveyor of the second machine is an outlet conveyor.

3. A device according to claim 1, wherein the handling members are arranged to push the articles along the guide rail.

4. A device according to claim 1, wherein the handling members are mounted to slide vertically relative to the flexible conveyor.

5. A device according to claim 4, wherein the control means comprise a cam path extending facing the flexible conveyor, and the handling members are associated with respective wheels running on the cam path.

6. A device according to claim 1, wherein the handling members are mounted on the flexible conveyor to move laterally relative to the flexible conveyor.

7. A device according to claim 6, wherein the control means comprise a cam path secured to the conveyor of the first machine and arranged to keep the handling members in their inactive position while the conveyor is engaged with the articles.

8. A device according to claim 7, wherein the conveyor of the first machine is a comb that performs reciprocating rectilinear movement.

9. A device according to claim 1, wherein the handling members are mounted on the flexible conveyor to pivot about a horizontal axis parallel to a local movement direction of the flexible conveyor.

10. A packaging installation comprising a container-blower machine with an outlet conveyor that implements intermittent rectilinear movement at a first predetermined pitch, and a container-filler machine with an inlet conveyor that implements continuous rotary movement, wherein the installation includes a transfer device according to claim 1 and installed between the blower machine and the filler machine in such a manner that the rectilinear segment extends facing the outlet conveyor of the blower machine and the rounded segment is tangential to the inlet conveyor of the filler machine, and wherein the device includes a driven pulley controlled by the filler machine.

11. An installation according to claim 10, wherein the driven pulley supports the rounded segment of the flexible conveyor of the transfer device.

12. A device for transferring articles between a first machine implementing intermittent movement of the articles at a first predetermined pitch, and a second machine implementing continuous movement of the articles at a second predetermined pitch, the device comprising a flexible conveyor extending around at least two pulleys so as to have at least one rectilinear segment facing a conveyor of the first machine and a rounded segment facing a conveyor of the second machine, the flexible conveyor of the device carrying laterally-projecting article-handling members arranged at regular intervals in such a manner that the handling members are at a pitch corresponding to the first pitch in said rectilinear segment, and said rounded segment has a radius such that the handling members are at a pitch corresponding to the second pitch in the rounded segment, wherein the flexible conveyor is a chain having links, each of which has one of the handling members mounted thereon and the device has a member for guiding and tensioning the chain, which member comprises two skids mounted between two rectilinear segments of the chain so as to bear against the segment, the two skids being connected together by resilient spacer means.

\* \* \* \* \*